United States Patent
Schena et al.

(10) Patent No.: US 6,448,979 B1
(45) Date of Patent: Sep. 10, 2002

(54) PRINTED MEDIUM ACTIVATED INTERACTIVE COMMUNICATION OF MULTIMEDIA INFORMATION, INCLUDING ADVERTISING

(75) Inventors: Robert J. Schena, Wayne, PA (US); Mike E. Anderer, Salt Lake City, UT (US); Peter B. Ritz, Meadowbrook, PA (US); Mike Bernstein, Tucson, AZ (US)

(73) Assignee: Airclic, Inc., Blue Bell, PA (US)

( * ) Notice: Subject to any disclaimer, the term of this patent is extended or adjusted under 35 U.S.C. 154(b) by 0 days.

(21) Appl. No.: 09/236,176

(22) Filed: Jan. 25, 1999

(51) Int. Cl.[7] .................................................. G06F 3/00
(52) U.S. Cl. ........................ 345/741; 345/733; 345/854; 709/201; 709/217; 707/500.1
(58) Field of Search .................................. 345/302, 326, 345/329, 333, 357, 700, 733, 762, 854, 741; 235/462.13, 462.15; 705/14, 17, 26; 707/501, 501.1; 709/201, 217, 219

(56) References Cited

U.S. PATENT DOCUMENTS

| | | | |
|---|---|---|---|
| 4,797,818 A | 1/1989 | Cotter | 364/401 |
| 5,122,959 A | 6/1992 | Nathanson et al. | 364/436 |
| 5,444,444 A | 8/1995 | Ross | 340/994 |
| 5,583,487 A | 12/1996 | Carter | 340/825.35 |
| 5,624,265 A | 4/1997 | Redford et al. | 434/307 |
| 5,694,551 A | 12/1997 | Doyle et al. | 395/226 |
| 5,804,803 A | 9/1998 | Cragun et al. | 235/375 |
| 5,825,002 A | 10/1998 | Roslak | 235/375 |
| 5,869,819 A | 2/1999 | Knowles et al. | 235/375 |
| 5,890,136 A | 3/1999 | Kipp | 705/22 |
| 5,905,248 A | 5/1999 | Russell et al. | 235/462 |
| 5,940,074 A | 8/1999 | Britt, Jr. et al. | 345/333 |
| 5,957,695 A | 9/1999 | Redford et al. | 434/307 |
| 5,978,773 A | 11/1999 | Hudetz et al. | 705/23 |
| 5,979,757 A | 11/1999 | Tracy et al. | 235/383 |
| 5,983,199 A | 11/1999 | Kaneko | 705/26 |
| 5,987,440 A | 11/1999 | O'Neil et al. | 705/44 |
| 5,995,105 A | 11/1999 | Reber et al. | 345/356 |
| 6,006,242 A | 12/1999 | Poole et al. | 707/531 |
| 6,031,621 A | 2/2000 | Binder | 358/1.1 |
| 6,034,680 A | 3/2000 | Kessenich et al. | 345/329 |

FOREIGN PATENT DOCUMENTS

WO   WO 97/01137   9/1997

OTHER PUBLICATIONS

Majer, A. et al., NewMedia, vol. 9, No. 1, p. 11, published Jan. 1999.

*Primary Examiner*—Raymond J. Bayerl
*Assistant Examiner*—Cuong T. Thai
(74) *Attorney, Agent, or Firm*—Morgan, Lewis & Bockius LLP

(57) ABSTRACT

The present invention describes a revolutionary new device bridging the gap between the virtual multimedia-based Internet world and the real world, best exemplified by print media. More particularly, the invention relates to communicating multimedia information using a scanner for machine-readable code containing a link information corresponding to a provider information depicted on the printed medium, a user interface for obtaining user input information corresponding to the provider information, a communications bridge for sending the link information and the user input information via the network, a receiver in communication with the scanner, capable of receiving the link information and user input information, and further capable of receiving and playing a multimedia information sequence, and a portal server in communication with the scanner via the network capable of selecting a multimedia information sequence corresponding to the link information and the user input information.

106 Claims, 4 Drawing Sheets

PRINTED MEDIUM ACTIVATED INTERACTIVE COMMUNICATION OF MULTIMEDIA INFORMATION, INCLUDING ADVERTISING

FIELD OF THE INVENTION

The present invention is a revolutionary new device for bridging the gap between the virtual multimedia-based Internet world and the physical world of print media. More particularly, the invention relates to communicating multimedia information across a network using a scanner capable of receiving data such as machine-readable code from a printed medium, the data containing a link information corresponding to a provider information; a receiver in communication with the scanner that is capable of receiving the link information and user input information, and of receiving and playing a multimedia information sequence from the network; and a portal server in communication with the scanner and the receiver via the network, the portal server being capable of selecting a multimedia information sequence corresponding to the link information and the user input information.

BACKGROUND OF THE INVENTION

Scanner technology has been used for many years in many contexts. By way of example, scanners are used in supermarkets, with personal computers, and in inventory, manufacturing, and resource control systems. However, scanner technology has not previously been thought of as a means to bridge the gap between static printed media and the "virtual world" of interactivity, which includes the Internet, advertising, entertainment, and electronic commerce.

Printed media have been the primary source of communicating information, including news and advertising information, for centuries. The advent of the Internet over the past few decades has expanded the concept of printed media by making it available in an electronically readable and searchable form and by introducing interactive multimedia capabilities unparalleled by traditional printed media. Unfortunately, many users of printed media do not possess the requisite technical expertise to use the Internet as an efficient source of information. Thus, although almost everyone in the world has access to printed media on a daily basis, only a small percentage of those people possess the requisite technical expertise to use the Internet.

There exists a need for a system that can link all users of printed media to the "virtual world" and that can deliver desired information to the user without regard to the user's technical expertise. The present invention provides such a system by using scanner technology to bridge the gap between printed media and the virtual world of interactivity and the Internet. Moreover, such a system enables those controlling the print media to enhance their presentation of information to their customers by providing them with a multimedia experience unavailable in traditional printed media.

SUMMARY OF THE INVENTION

The present invention comprises a system for communicating multimedia information via a network, such as the Internet, an intranet, or an extranet, wherein the communication is initiated from a printed medium. The system includes a scanner, a receiver, and a portal server, all interconnected via the network. In one embodiment, the scanner and the receiver comprises a single device. In another embodiment, the scanner communicates with the portal server directly, and customer premises equipment ("CPE"), serving as the receiver, plays multimedia sequence information received from the portal server. In a further embodiment, the CPE operates as both a scanner and a receiver. The multimedia sequence information may be advertising or transaction information and may contain one or more of textual, audio, or video information.

In a preferred embodiment, the scanner includes a memory, a user interface, and a communications bridge. The scanner may be, for example, a remote control, a mouse, a cellular telephone, a personal digital assistant, a personal computer, a pager, or a two-way pager. The scanner detects and reads data, such as machine-readable codes containing link information corresponding to, provider information from the printed medium. A plurality of codes may be stored in the scanner, the receiver, and the portal server. The link information corresponding to the provider information may include, for example, a universal resource locator, an Internet address information, trademark information, a source of origin, an organization name, a product name, a service name, benefit redemption information, provider defined information, user personal profile information, user interest information, server command information, and customer premises equipment preference information.

The user interface obtains user input information, such as an advertising authorization, a transaction authorization, user personal profile information, and user interest information corresponding to the provider information. The user input information may be received and stored by either the scanner, the receiver, or the portal server. The scanner routes the link information and the user input information based upon a user request via the user interface. The user interface may be, for example, a voice-activated system, a keypad, or a keyboard. In one embodiment, the user interface may reside on any one or more of the scanner, the receiver, such as customer premises equipment for displaying the multimedia sequence information, or the portal server.

The communications bridge sends the link information and the user input information to the receiver and, via the network, to the portal server. An infrared communications system, a mobile radio communications system, or an IP-based communications system are exemplary of the communications bridge.

The portal server is in communication with the scanner or the receiver via the network. In one embodiment, the portal server is accessible via the Internet to any Internet user. In another embodiment, the portal server is accessible only by the provider of information. The portal server is capable of receiving the link information and the user input information, selecting a multimedia information sequence corresponding to the link information and the user input information, and sending the multimedia information sequence via the network to the receiver. The portal server is further capable of tracking link information corresponding to a user, including a universal resource locator, Internet address information, a trademark information, a source of origin, an organization name, a product name, a service name, a benefit redemption information, a provider defined information, a user personal profile information, a user interest information, a server command information, and a customer premises equipment preference information. In a preferred embodiment, the portal server is further capable of tracking a percentage of a fee to be charged to the information provider based on, for example, the selected multimedia information sequence, the number and frequency of the link information received by the portal server corresponding to a particular information provider, or the transaction value in the event the selected multimedia information sequence generates a transaction. In another embodiment, the portal server is further capable of tracking a percentage of a fee to be charged to the information provider based on, for example, the selected multimedia information sequence and either of the user personal profile information or the user interest information. The portal server is further capable of auctioning the user interest information according to a user defined auction criteria in the user personal profile information to an information provider. The user personal profile information may be stored on the portal server.

The receiver is in communication with the scanner and the portal server, and is capable of receiving the link and user input information, receiving a multimedia information sequence, and playing the multimedia information sequence. The receiver may be a CPE, such as a television, a set top box, a computer, a cell telephone, a remote control, a personal digital assistant, an integrated PC-TV device (e.g. Web TV) or a pager.

DETAILED DESCRIPTION OF THE INVENTION

Figure 1:
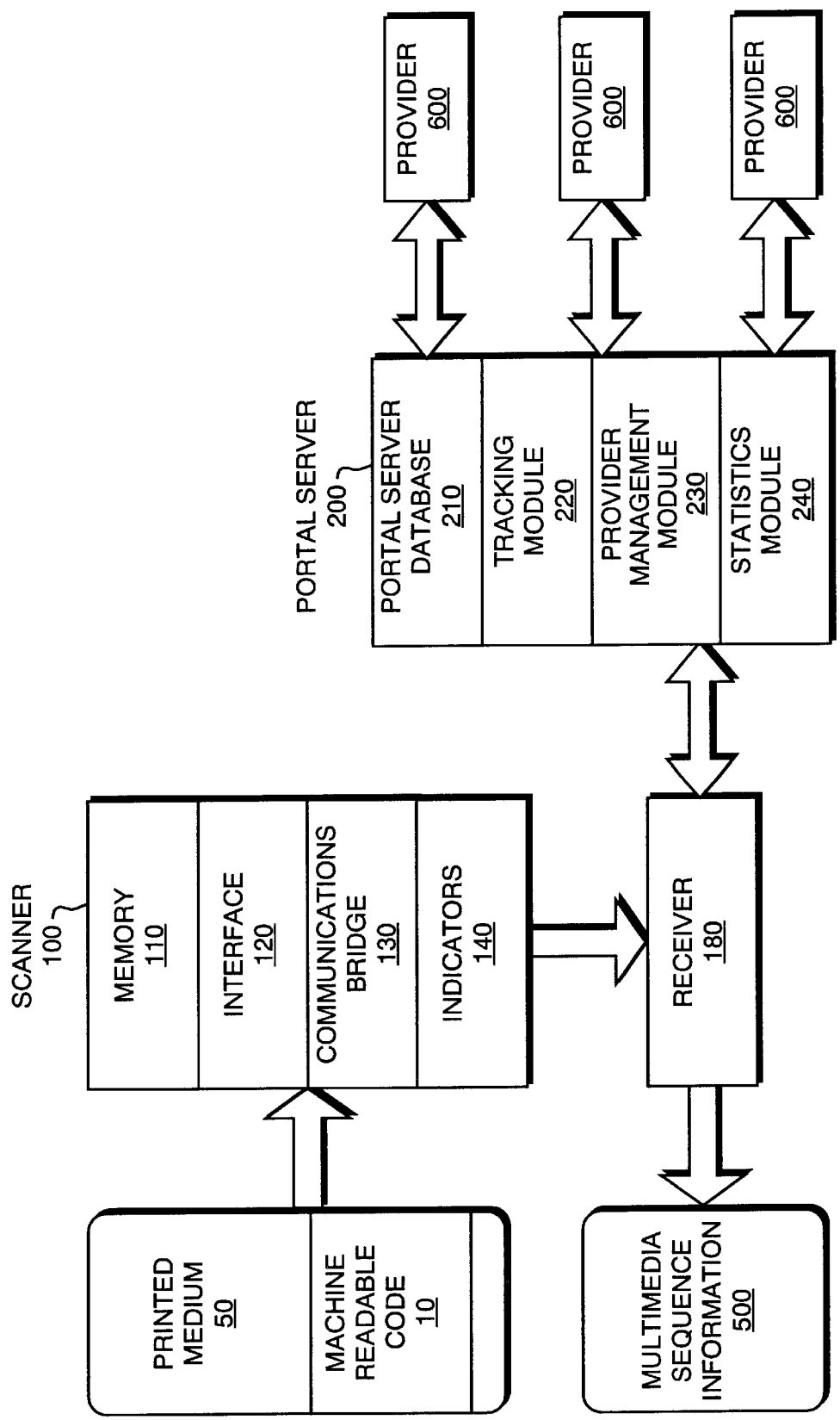
FIG. 1 depicts an embodiment of the present invention using a receiver to communicate with both a scanner and a portal server.

FIG. 1 depicts an embodiment of the present invention including three components: a scanner 100, a receiver 180, and a portal server 200. In one embodiment, the scanner 100 and the receiver 180 comprise into a single device. In another embodiment, the scanner 100 communicates with the portal server 200 directly, and a customer premises equipment ("CPE") 300, serving as the receiver 180, plays multimedia sequence information received from the portal server 200.

The scanner 100 may be a handheld device, preferably, but not necessarily, wireless. The scanner 100 may be, for example, an enhanced existing electronic device, a TV remote control, a mouse, a cell phone, a PC card device, a palmtop, a calculator, a key chain, a pen, an identification card, a smart card, a hand held GPS device, a desktop or laptop computer, a digital appliance, a microprocessor-based device, a personal digital assistant, a pager or a two-way pager.

The scanner 100 is capable of reading data such as non-coded data and machine-readable code 10 from the printed medium 50. The machine-readable code 10 may be a barcode, an enhanced barcode, a new enhanced code, or any type of code, including dynamic codes and high density barcodes.

The code 10 contains a link information corresponding to a provider information from a printed medium 50. The link information may correspond to a universal resource locator ("URL"), an Internet address information, network address information, a trademark information, a source of origin, an organization name, a product name, a service name, a benefit redemption information, a provider defined information, a user personal profile information (i.e., "a cookie"), a user interest information, a server command information, and a customer premises equipment preference information.

The link information may be an alphanumeric sequence printed in form of the machine-readable code 10. The alphanumeric sequence may be assigned to the printed medium 50 by the provider 600 and may be encoded according to the provider's 600 preference. The alphanumeric sequence may activate and result in the playing of the multimedia sequence information 500. For example, a machine-readable code 10 on the printed advertisement for an automobile may translate into the following alphanumeric sequence "A001B0990799A5557ZQZ6898". The "A001" designation may correspond to a template on the scanner 100 enabling Ford to present a person with a user input information asking whether the person is interested in advertisements, transactions, or both. The "B099" designation may refer to a type and name of the magazine which carried the ad. The "0799" designation may refer to July 1999 issue from advertiser A5557 which might be a local automobile dealer. The "ZQZ6898" designation may be the network code and could refer to a network address at the portal server 200 or to a link table. Existing UPC or ISBN numbers may serve as the alphanumeric sequence. At least one of the scanner 100, the receiver 180, or the portal server 200, may extract the provider information from such alphanumeric sequence and translate it into a network address at the portal server 200 or a link table.

The code 10 comprises at least one of the link information, and a publication information (i.e. where the information was published or located), along with a demographic and other advertising or message-specific information provided by a provider 600. The code 10 may also comprise personal and provider security information.

The system of the invention is also capable of collecting and managing code 10 that lacks link information. This linkless code information may be added to the cookie along with any additional user input information. The code 10 is capable of being read by a scanner 100 or a transducer generating and transmitting the link information based upon a stimulus. The scanner 100 or transducer is capable of differentiating between information and data contained within code 10. One type of the code 10 may be an information-only type that would link to an information page. A simple example of this would be a scanned universal product code ("UPC") printed on a can of food linking a person using the system to the manufacturer's information on nutrition, recipe, or transaction information. The system can also process UPC codes by directing them to a link table to resolve the link without any added codes. The system is capable of processing the ISBN number codes, UPC codes and any codes currently in use.

More complex interactive codes could be routed based on any of the scanned information in combination with user personal profile information (i.e. "a cookie"), user interactive responses from the user input information, the person's location or other demographic information and a portal server database 210 information. The cookie comprises a person's identifying information such as name, address, credit card(s) information, and other related information. Cookies may be stored on the scanner 100, the receiver 180, or the portal server 200. Other information that may be combined with the code 10 includes executable code downloaded from the portal server 200 or provider 600, and user input information that could further supplement the scanned information from code 10 by eliciting an interactive response from the person using the system One exemplary code corresponds to reordering information such that a reordering of a product may be activated by scanning the code 10, recognizing it as a reorder, and maintaining a transaction via the portal server 200 such that a percentage of a fee for the reorder is maintained by a fee tracking module 220. In an embodiment, the fee is shared with the person placing the transaction. In another example, an HMO pharmacy could encode patient information, medication information, and refill information onto a printed label of medication upon its dispensing. The information would be represented by code 10. Scanner 100 would read the code 10 and validate the personal information contained in the code 10 against the user personal profile information stored on either the scanner 100, the receiver 180, the portal server 200, or a provider 600. Once the validation is complete, the system allows for secure transactions to proceed, including authenticated refills, recording the transaction and maintaining an accounting of a percentage of a fee for the refill using the tracking module 220.

The system of the present invention contemplates using additional code types such as phone numbers, business card, service information, benefit redemption information, rebate, coupon, literature, or any general information category of interest to a person or information provider 600. The information contained in the additional code types may be uploaded to the scanner 100, receiver 180, or portal server 200 once or sent locally or with cookie and security information from anywhere in the network. The processing of codes 10, including additional code types, may optionally but not necessarily be done at a time different from reading and scanning the printed medium 50. In a preferred embodiment, the scanner 100 generates and stores a code file in memory 110 representing a collection of codes scanned by the operator in any given time period. The scanner 100 uploads the coded file in memory 110 to the receiver 180 according to a user initiated stimulus. For example, a user may find four advertisements of interest in a printed medium 50, such as a magazine. The scanner 100 could read the four codes 10 from the magazine advertisements and store them in the memory 110. Subsequently, at a time convenient to the user, the user can upload the information to the receiver 180 for processing.

The information in the code 10 could be simple data or complex data-type-plus data, such as encoded, printed multimedia information. A UPC code is an example of simple data. The information used by the system can also be non-coded or raw. For example, a universal resource locator ("URL") is non-coded data, but when encoded as a URL-type code 10, the information in the code 10 may be processed.

The system uses unique code templates for interactivity which contain transaction information, authorization information, references to the publisher, media originator, ad placement, date of publication, dealer, reseller or distributor. The system is capable of tracking the scans according to the code types used in scanning these ads and collecting the demographics. The system is also capable of tracking and redirecting the usage of the codes 10 by different information providers 600 based on the content of the printed information. For example, a person scans an identifying code 10 related to a brand of computer. The computer manufacturer would like to direct the person to its information site. However, the person who performed the scan or portal server 200 that processed the scan, may choose to auction off the instance of the scan to a competitor, thereby allowing the competitor to bid for the right to transmit more information to the person about the competitor's comparable product or a transaction, such as user interest information.

The system of the invention can communicate with digital copyright databases bearing the code in tangible format. For example, an article that includes the code 10 may direct a person wanting to copy the article to the copyright database. The system is further capable of charging the person a fee and suggesting related articles based on the information in the code 10. The system can monitor the commercial, office, and copying equipment connected to the network that processes the code, and can then activate the access to the copyrighted materials database. In that context, the code serves as an intelligent watermark capable of carrying the article identifying information, distribution information, and fee related information.

Preferably, the code 10 features a small footprint, an attractive appearance, a high density of information, and ease of scanning. For example the footprint may be a triangle shaped code with a logo and an indicator of what type of code 10 it is (information, e-commerce, or both). The identifying characteristics of the presentation of the code 10 signify that the code is not an ordinary advertisement, but part of an enhanced information medium leading to multiple dimensions of multimedia information sequences 500.

The scanner 100 can transmit the code 10 to a receiver 180, such as a television, a set top box, a computer, a cell telephone, a remote control, a personal digital assistant, an integrated PC-TV device (e.g., Web TV), a pager or two-way pager, or directly to the portal server 200. The receiver 180 is in communication with a network, such as the Internet or other network, and can direct or link a person to a specific network address or site based on the machine-readable code or codes 10 contained in the scanned information from the printed medium 50.

For example, the provider information depicted on a printed medium 50 may be advertising information for an automobile. The manufacturer of the automobile would be provider 600. The link information in code 10 from the printed advertisement may include network address information, such as for example the manufacturer's web site. Processing the link information may result in playing a multimedia information sequence 500 on the receiver 180 provided by provider 600. Additionally or in the alternative, the network address information may point to a file containing executable computer code which could be downloaded or executed remotely then displayed on the receiver 180 or scanner 100. One or more link table(s) (not shown) may also be used to facilitate a two-way communication between the provider 600 and receiver 180. A link table containing network codes and associated network address information, for example, may be accessed to process link information containing only the network code. The link table associates the network code to a network address information to facilitate the connection between provider 600 and receiver 180. Link information may also be cascaded via the link table(s). Link tables may be located on or be accessible to the receiver 180, the portal server 200, or the provider 600. The machine-readable code 10 can also link the person directly to a specific Internet address without accessing a link table.

In a preferred embodiment, the scanner 100 includes a memory 110, a user interface 120, and a communications bridge 130.

The user interface 120 obtains user input information, such as an advertising authorization, a transaction authorization, a user personal profile information, and a user interest information corresponding to the provider information. The user input information may be received and stored in the scanner memory 110, the receiver 180, or the portal server 200. The scanner 100 routes the link information and the user input information based upon a user request via the user interface 120. The user interface 120 may be, for example, a voice-activated system, a keypad, or a keyboard. In one embodiment, the user interface 120 may reside on any one or more of the scanner 100, the receiver 180, such as a customer premises equipment ("CPE") 300 for displaying the multimedia sequence information 500, or the portal server 200.

The communications bridge 130 sends the link information and the user input information to the receiver 180 and, via the network, to the portal server 200. An infrared communications system, a mobile radio communications system, or an IP-based communications system are exemplary of the communications bridge.

The scanner 100 comprises a handheld component in a preferred embodiment. The handheld component may comprise an enhanced existing device like a TV remote control, a mouse, a cell phone, a REX device, a palmtop, a calculator, a key chain, a pen, an identification card, a smart card, a hand held global positioning system ("GPS") device, a desktop or laptop computer or virtually any other digital appliance or a microprocessor based device. The scanner 100 could be a proximity-based device that would activate a smart button, which is a device having a memory and a communicator to upload the information in the memory to a network, or a contact-based device. For example, scanner 100 may be either an optical scanner or a transducer, respectively. In a preferred embodiment, the scanner 100 has several modes, such as scan and process, scan and hold, and scan and display. The scanner 100 may also have a mode allowing copying of the code 10 for backup or review and edit. In another preferred embodiment, the scanner 100 may have a light and/or a sound indicator for confirming that a valid scan occurred. An embodiment may also have transmit and receive indicators 140 for confirming that a valid scan occurred. Optionally, the scanner 100 could communicate with another scanner 100 to exchange link, code, or cookie information.

Figure 2:
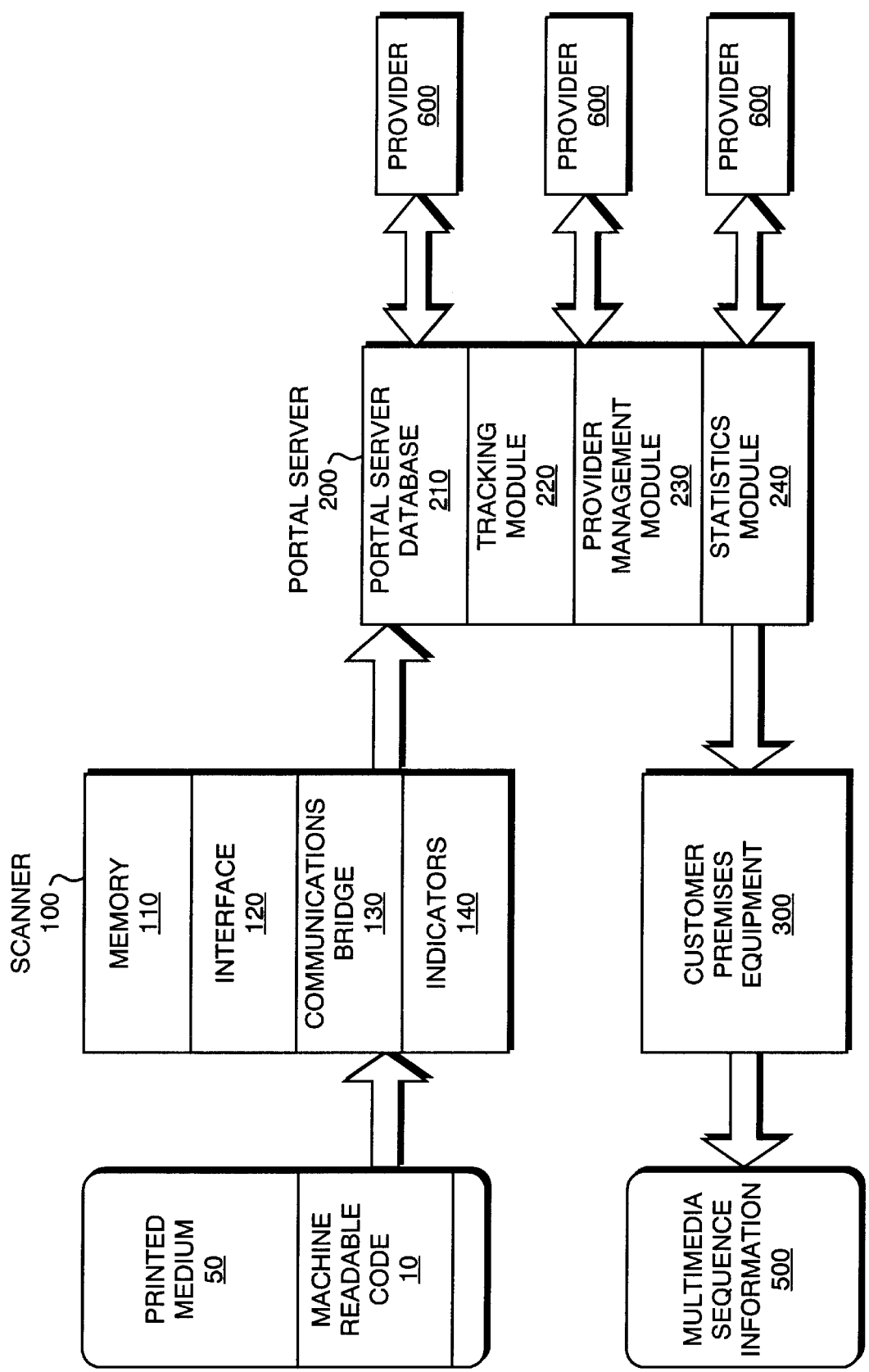
FIG. 2 depicts an embodiment of the present invention wherein the scanner communicates with a portal server directly without a receiver.
Figure 3:
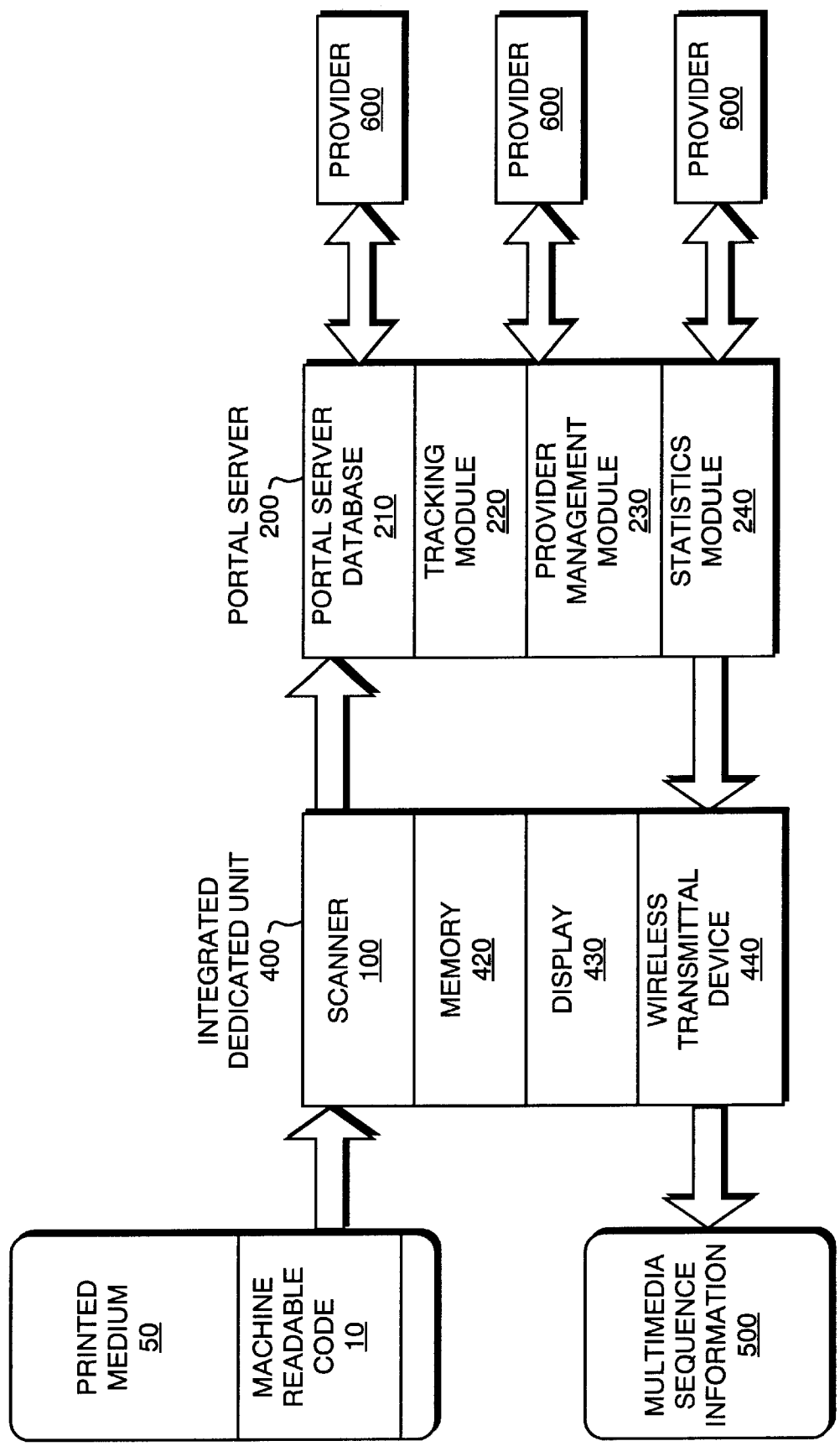
FIG. 3 depicts an embodiment of the present invention wherein the scanner and the customer premises equipment are integrated into one device.
Figure 4:
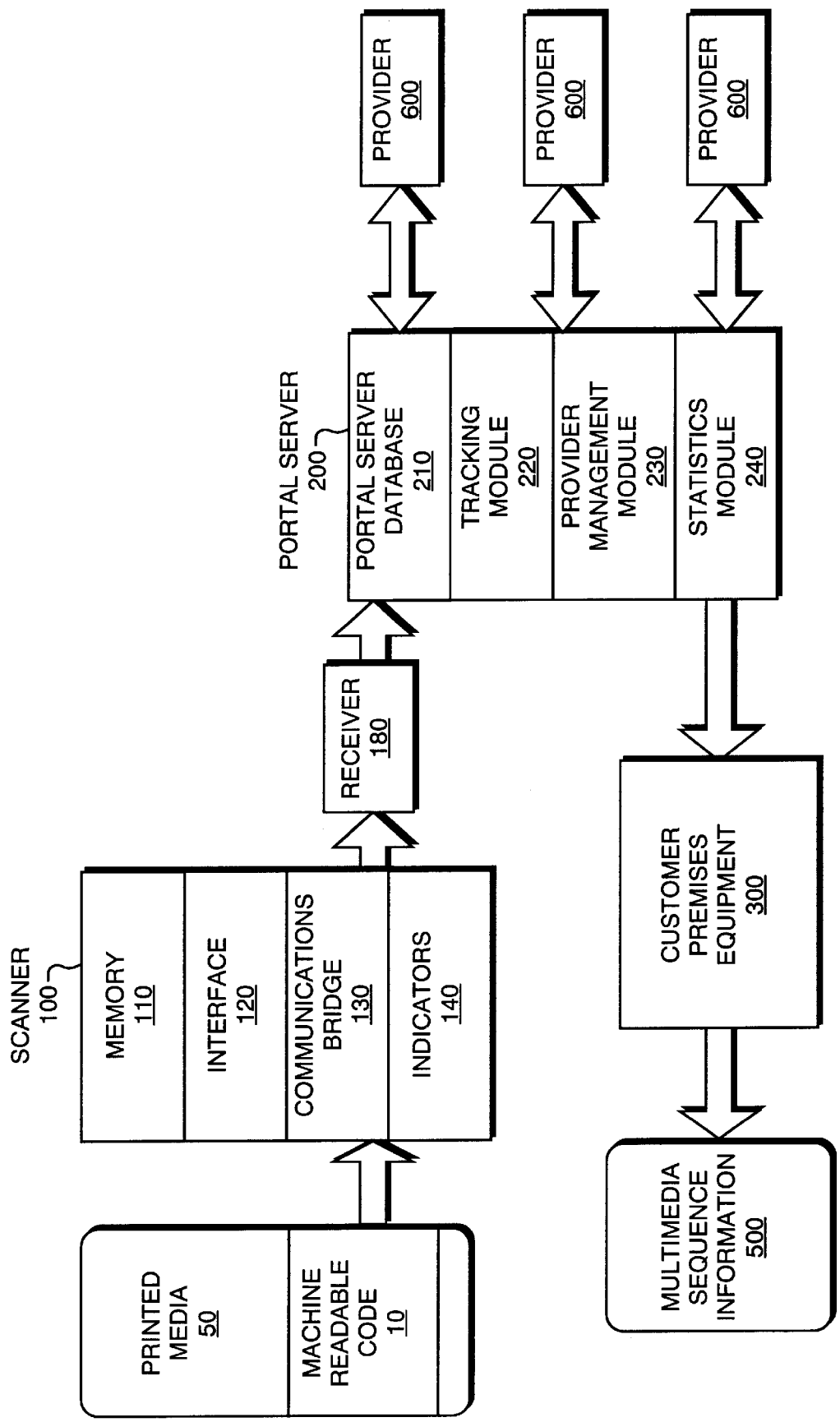
FIG. 4 depicts an embodiment of the present invention wherein the a customer premises equipment is separate from the receiver and the scanner.

FIG. 3 depicts an embodiment in which the scanner 100 is part of an integrated dedicated unit 400 which includes a memory 420, a microprocessor (not shown), stored templates containing the link and cookie information (not shown), a display 430, a cable (not shown), and a wireless transmitting device 440, such as infrared, visual or radio frequency. The dedicated unit 400 could contain any subset of these components or include other components as depicted in FIGS. 2 and 4.

The system of the invention enables scanning of encoded information from the embedded codes 10 and uploading these codes to the portal server 200 for immediate or delayed processing or for reference. The system is capable of allowing print advertisers to track their impressions to execution and to collect demographic information about the person performing the scan through a tracking module 220,. The tracking module 220 is illustrated in FIG. 1 as part of the portal server 200, however, it may reside in any of the 100, 180, 400, 300, 200, or 600 components of the system. The tracking module 220 is further capable of tracking the transaction value of e-commerce transactions originating from a specific publication, type of publication, or provider 600 and calculate fee percentages based on the transaction. For example, in one embodiment, the scanner 100 comprises a clock capable of tracking the time the ad was scanned. In an embodiment where scanner 100 is a GPS, the geographical location where the scan occurred may also be tracked. The system also contemplates transmitting bio-metric information according and to the extent permitted by the user personal profile information. The combination of all tracking information comprises ad read-scan context information which may be transmitted to the portal server 200 or to the provider 600 according to and to the extent permitted by the user personal profile information.

The receiver 180 of the present invention is in communication with the scanner 100, and portal server 200 via wire, or through wireless technology such as infrared, light based transmission, radio frequency, or satellite. The receiver 180 could be incorporated into or be a computer, a cell phone, a pager, a remote control, a personal digital assistant, a simple buffer, or use a direct link. The receiver 180 could also be incorporated into existing devices such as a television, a set top box, a Web TV device, a VCR, a Digital Versatile Disc ("DVD") player, an appliance, a customer premises equipment ("CPE") 300, or any other electronic device. The receiver 180 may, but not necessarily, collect, sort and prioritize the transmissions of link and user input information. The receiver 180 could queue up these transmissions or process them immediately. The receiver 180 could also contain at least one cookie, and received time information, as well as other information including receiver or provider specific information.

In one embodiment, the receiver 180 forwards the raw scanned codes 10 directly to the portal server 200 or other site such as a provider 600 via a portal server 200. In another embodiment, the receiver 180 collects, stores, processes, and forwards the scanned code information along with the cookie and other state dependant information, such as time, temperature, and location, to the network.

The receiver 180 may be multi-functional and include multiple inputs such as radio frequency and infrared. The receiver 180 may also incorporate X-10, wireless, wired, and power-line networking to link to multiple units or, for larger installations, at least one repeater. The receiver 180 may also incorporate wireless, wire-line, or power-line links to at least one local computer or CPE 300.

In embodiments shown in FIGS. 2 and 4, the CPE 300 may function as a queue processor or pre-processor. Also a user may enter information using the CPE 300, including user personal profile information. In another embodiment, scanned codes 10 are processed by the CPE 300 according to user preferences. By way of example, the CPE 300 could process the codes 10 automatically and sequentially as the codes 10 are received, or store the codes 10 in a queue to be processed at the convenience of the user. Cookies may be stored on one or more of the CPE 300, the scanner 100, and the receiver 180. The CPE 300 receives the scanned code 10, including the link information from scanner 100, and transmits the code 10 to the portal server 200. The portal server 200 resolves the link information and sets up a path from a location on the network, such as a specific web address, Internet site, or provider 600 location, to the receiver 180. The location sends information, such as multimedia information sequences 500, along the path to the receiver 180 for display and playback.

The system of the present invention contemplates at least one portal server 200. The portal server 200 may be a single site or multiple sites. The portal server 200 is in communication with the scanner 100 and the receiver 180 via the network and centrally manages, assigns, and controls the codes 10, code types and information from the printed media 50. The portal server 200 is capable of receiving the link information and the user input information, selecting a multimedia information sequence 500 corresponding to the link information and the user input information, and sending the multimedia information sequence 500 via the network to the receiver 180.

One advantage of the system is the minimal amount of information needed to be scanned to link to a specific location when using a link information database including cookies at the portal server 200. The portal server 200 processes code 10 which may contain levels of embedded information, and references information, such as database information provided by providers 600, advertisers, and information providers. The information contained in scanned code 10 may be combined with at least one of the user input information, the cookie, state dependant information, ad read-scan context information and other transmitted information to link the portal server 200 to at least one location on the network and complete a transaction, such as a request for information or an e-commerce transaction.

In one embodiment, the portal server 200 is adapted to receive and process requests from a user who provides the portal server 200 with raw code 10 through a communications device such as a keyboard, a telephone, a voice activated system, or a modem. In this embodiment, a user can initiate the interactive communication of multimedia information without using scanner 100. In a further embodiment, the scanner 100 may access the portal server via a telephone dial system. For example, after scanning, a user may use a telephone to communicate the scanner 100 to the network. Once data has been transferred, the user may use a voice menu system to control the remainder of the transaction, such as the receipt of sound only multimedia information, or engaging in a transaction. In another embodiment, the portal server 200 has a single common database of links for print and electronic transactions. The database of links may be accessed by users of the system, such as advertisers, print media owners, and information providers 600.

A tracking module 220 in the portal server 200 can track link information corresponding to a user, such as a universal resource locator, an Internet address information, a trademark information, a source of origin, an organization name, a product name, a service name, a benefit redemption information, a provider defined information, a user personal profile information, a user interest information, a server command information, and a customer premises equipment preference information.

The tracking module 220 is also capable of tracking fees associated with every ad and every transaction originating on the network via the portal server 200. Fees may be based on, for example, the selected multimedia information sequence, the number and frequency of the link information received by the portal server corresponding to a particular information provider, or the transaction value in the event the selected multimedia information sequence generates a transaction. The fee tracking module 220 can track fees relating to at least one e-commerce transaction originating from the scan.

A provider management module 230 and a statistics module 240 in the portal server 200 maintain advertising information and transactions generated from the providers 600 that originate independent of a scan based on user personal profile information. Thus, the invention allows advertisers to broadcast to users of the portal server 200 according to the user personal profile information or portal server configuration. The provider management module 230 is capable of providing feed back to the providers regarding the effectiveness of the provider's printed media 50, and allows for flexible, real-time message tuning.

An indigraphics module (not shown) in the portal server 200 performs user personal profile information management functions, such as marking and publishing auction oriented information based on the user personal profile and interest information.

A funds management module (not shown) in the portal server 200 manages and facilitates fund transactions between users of the system. The funds management module processes information from the other modules in the portal server 200, such as the tracking module 220. Preferably, the funds management module uses a form of electronic funds transfer, such as Ecash, to accept and distribute funds according to information received form the tracking module 220.

For example, according to the invention a person can scan an ordinary black and white car ad placed in a newspaper by a local dealer that is enhanced with code 10. Shortly thereafter, the person experiences a full-featured multimedia presentation related to the car ad on the person's Web TV or computer. The tracking module 220 calculates a fee to be shared between the manufacturer, the dealer, and the person buying the car based on a percentage of the sale. The funds management module can accept Ecash from the person and either distribute it to all parties involved in the transaction or store the information as debits and credits in an account database.

In another example of the invention, a person can go to the grocery store and scan UPC codes 10 off items and check the nutrition information or recipes at the end of the aisle in a kiosk with or without a printer. Alternatively, the person can take the UPC information home and upload it to their receiver 180 or a CPE, and get information on the product, a coupon, or other benefit redemption information. The store could optionally provide a link to the net so the user could upload the information to his home computer from the store via the Internet connection.

In another example of the invention, stuffed animals could be linked to a location on the network by using a scanner 100. The scanner 100, according to this example can be a proximity-based device, such as a smart button (like those in Java rings), or almost any other kind of device including security cards and access devices.

In another example, a person can scan a 5 year old computer monitor on the person's desk and be immediately routed to a web page that offers a list of local service centers for the monitor or technical information about the monitor, such as schematics, instruction manuals, or warranty manuals. The transaction could also result in the person receiving a rebate offer, a trade-in offer, or recall and safety information. The invention enables manufacturers to maintain contact with customers for extended periods of time beyond the traditional period of time manufacturers and customers interact. The contact enables the manufacturer to collect product usage information that was traditionally inaccessible. Manufacturers could also use incentive programs to get people to scan their products.

The invention provides for allowing the information providers 600 to electronically receive codes 10 to embed in the advertisements. It also allows the publishers of the advertisements, such as newspaper and magazine companies, to print their own ad codes and share this information with the portal server 200. The invention contemplates using an enhanced code in the ads containing information on the identity of the publication and the product. The system enables the publishers to share in the flow-through profits of a transaction even though they may not provide any products. The system further enables simple marketers and catalogue providers to operate with reduced infrastructure by including information in the code 10 which points to portal-operated e-commerce stores or to the manufacturer/distributor's e-commerce store.

Reprints of copyrighted material could also be a service the portal server 200 provides to authors. Authors may embed a code 10 in their book or article. A user scanning the code 10 could receive a copy of the entire article or related articles or books or information for an appropriate fee. The invention provides authors with an inexpensive method for collecting fees that are typically very small. A copyright service portal server could credit the author's account by pennies or even fractions of pennies per downloaded page via an existing e-commerce service or another portal server. Fees associated with accessing and downloading moderately and expensively priced items, such as CDs and newsletters, can be handled in a similar fashion.

The invention further contemplates setting up medical testing devices to operate with the system. A body monitor capable of tracking medical information regarding the person's then existing medical condition could communicate this information periodically or when a parameter is so indicated or satisfied. The system of the invention features the ability to combine wired and wireless raw data with user input, state information, and cookie information, at the portal server 200. The portal server 200 directs and channels the information based on the user personal profile information. The base information could be a code that is scanned or is embedded in a device that adds the base information to information collected by the body monitor. The link at the portal server 200 may be dynamically moved and a new version of the body monitor's embedded code or a new set of parameters may be downloaded from a location on the network.

The invention also contemplates using the system to collect alarm and appliance information from household items. The system includes a central receiver capable of receiving radio frequency or infrared signals. A raw data stream, pointer information, and state information may be transmitted from the household item to the receiver. The receiver communicates the information to the portal server. The portal server can combine the information with a cookie and use the pointer information to securely send it to the manufacturer's web site.

The system of the invention has several modes of operation, including collect and store, collect and execute, and collect and process then execute. The user sets the mode according to the user personal profile information. The user interface of the scanner, settings on the receiver and software settings on the CPE 300 or the portal server 200 may also be combined with the user personal profile information to set the mode.

Existing remote control devices such as television remote controls can be modified to scan and transmit the code 10 to a receiver 180 such as a set top box. In one embodiment, the code 10 would be scanned and embedded after a specific sequence of standard codes that could be stripped out by the receiver 180. For example, in collect and store mode, pressing a predetermined sequence of buttons on a remote control will activate the scan mode of the remote. Once activated, the remote control can be used to collect and store a code 10 from a magazine advertisement, for example. The user would then point the remote at the set top box and depress a single key or sequence of keys to transmit the code information.

Information such as multi-media information sequences 500, may be transmitted to a CPE 300, or any other receiver 180 connected to the network. The receiver 180 and a local CPE 300 could be combined into a single unit. The receiver 180 could be a dumb or smart device, embedded or stand alone. The CPE could be a PC or could be omitted or replaced by online processing or by a Web TV. The receiver 180 and scanner 100 of the invention can be combined and included as part of an enhanced WebTV.

The present invention may be embodied in other specific forms without departing from the spirit or essential attributes thereof and, accordingly, reference should be made to the appended claims, rather than to the foregoing specification, as indicating the scope of the invention.

What is claimed is:

1. A system for communicating multimedia information via a network by initiating a communication from a printed medium containing provider information, the system comprising:
    a network
    a scanner for receiving data from the printed medium, the data comprising link information corresponding to the provider information, the scanner comprising
        a memory;
        a user interface for receiving user input information, the user input information capable of being stored in the memory; and
        a communications bridge in communication with the network;
    a receiver in communication with the scanner, the receiver capable of receiving and communicating the link information and the user input information via the network and receiving and playing a multimedia information sequence; and
    a portal server in communication with the scanner and with the receiver via the network, the portal server capable of receiving the link information and the user input information, selecting the multimedia information sequence corresponding to the link information and the user input information, and transmitting the multimedia information sequence via the network to the receiver.

2. The system of claim 1 wherein the data is machine-readable code.

3. The system of claim 2 wherein the machine-readable code is a selected one of a barcode, an enhanced barcode, a new enhanced code, a dynamic code, and or a high density barcode.

4. The system of claim 2 wherein the machine-readable code further comprises publication information.

5. The system of claim 2 wherein the machine-readable code further comprises personal security information.

6. The system of claim 2 wherein the machine-readable code further comprises a provider security information.

7. The system of claim 2 wherein at least one machine-readable code is stored in a code file.

8. The system of claim 7 wherein the code file is stored in the scanner memory.

9. The system of claim 1 wherein the link information is a selected one of a universal resource locator, an Internet address information, a trademark information, a source of origin, an organization name, a product name, a service name, a benefit redemption information, a provider defined information, a user personal profile information, a user interest information, a server command information, a customer premises equipment preference information, and an alphanumeric sequence printed in form of a machine-readable code.

10. The system of claim 9 wherein the alphanumeric sequence is assigned by a provider of the provider information.

11. The system of claim 10 wherein the provider information is extracted from the alphanumeric sequence and translated into a network address at the portal server.

12. The system of claim 10 wherein the provider information is extracted from the alphanumeric sequence, the system further comprising a link table capable of translating the alphanumeric sequence into a network address.

13. The system of claim 10 wherein the alphanumeric sequence is on of a UPC and ISBN number.

14. The system of claim 1 further comprising a plurality of link information.

15. The system of claim 1 wherein the scanner and receiver are combined into a single unit.

16. The system of claim 1 wherein the scanner is further capable of routing the link information and the user input information to the network in response to a user request via the user interface.

17. The system of claim 1 wherein the communications bridge is capable of sending the link information and the user input information to the receiver.

18. The system of claim 1 wherein the communications bridge is capable of sending the link information and the user input information to the portal server.

19. The system of claim 1 wherein the scanner is a hand-held device.

20. The system of claim 19 wherein the hand-held device is wireless.

21. The system of claim 1 wherein the portal server is accessible via the network to a network user.

22. The system of claim 1 wherein the portal server is accessible exclusively by a provider of information.

23. The system of claim 1 wherein the user input information comprises a user personal profile information.

24. The system of claim 1 wherein the user input information comprises a user interest information.

25. The system of claim 1 wherein the scanner is capable of storing a plurality of data.

26. The system of claim 1 wherein the user input information is selected from the group consisting of an advertising authorization, a transaction authorization, and a user personal profile information.

27. The system of claim 1 wherein the scanner is a remote control, a mouse, a cellular telephone, a personal digital assistant, or a personal computer.

28. The system of claim 1 wherein the user interface is a voice activated system, a keypad, or a keyboard.

29. The system of claim 1 wherein the communications bridge is an infrared communications system, a mobile radio communications system, or an IP-based communications system.

30. The system of claim 1 wherein the network is the Internet, an Intranet, or an Extranet.

31. The system of claim 1 wherein the scanner is an enhanced existing electronic device, a TV remote control, a mouse, a cell phone, a PC card device, a palmtop, a calculator, a key chain, a pen, an identification card, a smart card, a hand held GPS device, a desktop or laptop computer, a digital appliance, or a microprocessor-based device.

32. The system of claim 1 wherein the portal server further comprises a tracking module capable of tracking the link information corresponding to the user.

33. The system of claim 1 wherein the portal server further comprises a tracking module capable of tracking a percentage of a fee to be charged to the information provider.

34. The system of claim 33 wherein the fee is based on at least one of the selected multimedia information sequence, a number and frequency of the link information received by the portal server corresponding to a particular information provider, or a transaction value when the selected multimedia information sequence generates a transaction.

35. The system of claim 1 wherein the multimedia information sequence is advertising or transaction information.

36. The system of claim 1 wherein the user input information further comprises a user personal profile information.

37. The system of claim 36 wherein the portal server is further capable of tracking a percentage of a fee to be charged to the information provider based on the selected multimedia information sequence and the user personal profile information.

38. The system of claim 36 wherein the user input information is a user interest information, and the portal server is further capable of auctioning the user interest information to an information provider according to a user defined auction criteria in the user personal profile information.

39. The system of claim 38 wherein the user personal profile information is stored on the portal server.

40. The system of claim 1 wherein the user input information further comprises at least one of a user interest information.

41. The system of claim 40 wherein the portal server is further capable of tracking a percentage of a fee to be charged to the information provider based on the selected multimedia information sequence and the user interest information.

42. The system of claim 1 wherein the scanner and the customer premises equipment device embody a single device.

43. The system of claim 1 wherein the customer premises equipment is either of a television, a set top box, a computer, a cell telephone, a remote control, a personal digital assistant, an integrated PC-TV device, or a pager.

44. The system of claim 1 wherein the multimedia sequence information is one or more of textual, audio, or video information.

45. The system of claim 1 further comprising a receiver in communication with the communications bridge.

46. The system of claim 1 wherein the machine-readable code changes dynamically.

47. The system of claim 1 further comprises a tracking module located in either of the scanner, the receiver, or the portal server.

48. The system of claim 47 wherein the tracking module includes tracking the link information and the user input information.

49. The system of claim 47 wherein the tracking module includes tracking the percentage of a fee to be paid back to a user of the system and to a manager of the portal server, according to the user personal profile information.

50. The system of claim 1 wherein the portal server further comprises a provider management module for controlling the duration and frequency of multimedia sequence information independent of scan generated transactions and for billing the information provider a fee for presenting the multimedia sequence information.

51. The system of claim 1 wherein the scanner maintains a clock for synchronizing scan related information which is transmitted with the user input information.

52. The system of claim 1 wherein either of the scanner, the receiver, or the portal server maintains a provider management module capable of
controlling the multimedia sequence information;
tracking the duration and frequency of the displayed multimedia information as part of the sequence at the receiver, wherein the sequence is in part provided by an information provider via the network;
billing the information provider a fee for displaying the provided multimedia information as part of the sequence; and
tracking a percentage of the fee which will be paid back to an owner of the receiver.

53. The system of claim 1, further comprising an interactivity feature for selectively accessing the multimedia sequence information by a user at any time via an interactivity button of the scanner.

54. The system of claim 53, wherein the interactivity feature is capable of accessing an application as part of the sequence provided by an information provider to maintain a transaction between a user and the information provider.

55. The system of claim 54, wherein the portal server is capable of controlling the transaction.

56. The system of claim 55, wherein the portal server is further capable of controlling a number of transactions between the user and the information provider and a number of interactions between the user and the information provider.

57. The system of claim 56, wherein the portal server is further capable of billing the information provider a fee for maintaining either of the controlled number of transactions or the controlled number the interactions.

58. The system of claim 57, wherein the administration workstation is further capable of tracking a percentage of the fee which will be paid back to an owner of the scanner.

59. The system of claim 58, wherein the transaction is either of catalog shopping or a purchase.

60. A system of claim 1 wherein the link information includes a network address information.

61. The system of claim 60, wherein the network address information points to a file containing executable code.

62. The system of claim 1, wherein any one or more of the scanner, the receiver, or the portal server contains at least one link table.

63. The system of claim 1, wherein any one or more of the scanner, the receiver, or the portal server contains additional information or downloaded executable code and intelligence that could supplement the code 10 with an interactive response of the person using the system.

64. The system of claim 63, wherein the additional information comprises the person's identifying information, name, address, credit card(s) information, and related information.

65. The system of claim 1, wherein the code is capable of containing personal information and reorder information printed by the provider, whereby the personal information is validated against the user personal profile information before a reorder or another transaction is allowed to proceed.

66. The system of claim 1 wherein the code is an information-only type capable of linking to an information page.

67. The system of claim 66, wherein the code is a universal product code.

68. A system of claim 66, wherein the user is either of a proximity-based device capable of activating a smart button or a contact-based device.

69. The system of claim 1, wherein the code is routed based on any of the scanned information in combination with the cookie information, the person's interactive responses from the user input information, the person's location or other demographic information and the portal server database information.

70. The system of claim 69, wherein the code is a reorder code, whereby reordering of a product may be activated by scanning the code, recognizing it as the reorder code, and maintaining a transaction via the portal server such that a percentage of a fee for the reorder is maintained by a tracking module.

71. The system of claim 70, wherein, the tracking maintains fee sharing with the person originating the transaction.

72. The system of claim 1, wherein the code types include a phone number, a business card, service information, benefit redemption information, a rebate, a coupon, a literature, or general information category of interest to a person or information provider.

73. The system of claim 1, wherein the code is uploaded to either of the scanner, the receiver, or the portal server once or alternatively is sent locally or with cookie and security information from anywhere in the network.

74. The system of claim 73, wherein the fee tracking module tracks fees relating to e-commerce transactions originating from the scan.

75. The system of claim 1, wherein the processing of the collected codes could be done at a time different from reading and scanning the printed medium.

76. The system of claim 1, wherein the code is a UPC code, whereby the user is directed to a provider via a link table without any additional codes.

77. The system of claim 1, wherein one or more of the scanner, the receiver, or the portal server maintains code templates for interactivity, transaction information, authorization information, references to the publisher, media originator, ad placement, date of publication, dealer, reseller or distributor.

78. The system of claim 1, wherein one or more of the scanner, the receiver, or the portal server maintains a tracking module working in conjunction with a statistics module collecting the scanned information on the basis of code types used in scanning the provider information and collecting demographic information relating to the user personal profile information, link information, and user input information.

79. The system of claim 78, wherein the tracking module is capable of tracking, redirecting, and targeting usage of the codes by different information providers based on the content of the printed information.

80. The system of claim 79, wherein the person or the system may choose to publish the fact of the scan, thereby allowing a competitor to bid for the right play to the person more information about the competitor's comparable product or a transaction, based upon the user interest information.

81. The system of claim 1 in communication with at least one digital copyright database corresponding to physical published products bearing the code in tangible format, whereby the scan directs a person wanting to copy the published product to the copyright database via the portal server, and the portal server tracks fees based on the copy and is capable of suggesting topically related published products.

82. The system of claim 81, wherein the portal server monitors xerographic equipment connected to the network for the processing of the code, which then activates the access to the copyrighted materials database.

83. The system of claim 82, wherein the code is an intelligent watermark capable of carrying identifying, distribution, and fee related information on a physical published product.

84. The system of claim 1, wherein any one or more of the scanner, the receiver, the portal server, or the provider is capable of allowing either the information provider or an owner-publisher of printed medium to track scanned printed medium impressions to execution and to collect demographic information according to the user personal profile information.

85. The system of claim 84, wherein the tracking feature tracks the percentage of e-commerce transactions originating from a specific publication, provider, or specific type of publication.

86. The system of claim 1, wherein the tracking feature tracks the percentage of a fee to be paid back to the owner-publisher of the printed medium based on the number of impressions.

87. The system of claim 1, wherein the receiver is a customer premises equipment, a computer, a simple buffer, or a direct link, a television, a set top box, a PC-TV device, a VCR, a DVD player, an appliance, or any other electronic device.

88. The system of claim 1, wherein the portal server comprises one or multiple sites where the processing of the codes takes place.

89. The system of claim 1, wherein the portal server allows central management, assignment, and control of the codes and code types and provider information.

90. The system of claim 1, wherein the portal server allows advertisers to the portal server, print media owners, and information providers to have a single common database of links for print and electronic transactions.

91. The system of claim 1, wherein the portal server maintains a fee tracking module for tracking charges based on an ad or a transaction originating on the network via the portal server.

92. The system of claim 1, wherein the portal server maintains a provider management module and a statistics module for tracking and maintaining advertising and transactions generated from the providers but originating independent of a scan, based on user personal profile information.

93. The system of claim 92, wherein advertisers are able to broadcast provider information to the portal server users according to the user personal profile information or general portal configuration.

94. The system of claim 93, wherein the provider management module is capable of providing feed-back to the information providers regarding the effectiveness of the provider printed information, and allowing for flexible, real-time message tuning.

95. The system of claim 1, wherein the portal server maintains an indigraphics module for providing the user personal profile information management functions and for publishing auction-oriented information based on the user personal profile and user inter formation.

96. The system of claim 95, wherein the indigraphics module operates in conjunction with a tracking module collecting the user personal profile information corresponding to bidding users who scanned or expressed interest via the user interest information, whereby the tracking module tracks bids placed by bidding users according to published auction information and tracks a percentage of a fee to be paid back to the publisher of the auction information and a media publisher who printed, published, or originated the bid.

97. The system of claim 1, wherein the portal server maintains a code management module allowing the information providers to electronically set and maintain codes, and the corresponding link information.

98. The system of claim 97, wherein the code management module allows the media providers to create and print their own codes and share the code information with the portal server.

99. The system of claim 1, wherein one or more of the scanner, the receiver, and the portal server maintains the ability to dynamically change the link or a link table at the portal and to effect a download of a new version of a code or a new set of templates or a new link.

100. The system of claim 1, wherein the machine-readable code is either a universal product code or an ISBN code.

101. The system of claim 100, wherein the portal server is capable of selecting the multimedia sequence information based on the link information containing any one or more of a producer name, a distributor name, or a product name, and based on a provider preference link accessible to the provider.

102. A method for communicating multimedia information via a network connecting a scanner, a portal server, and a customer premises equipment, wherein the communication is activated via a printed medium, the method comprising the steps of:
　scanning a machine-readable code containing a link information corresponding to a provider information from the printed medium using a scanner;
　storing the machine-readable code in a memory;
　extracting the link information from the machine readable code in the memory;
　obtaining and storing a user input information corresponding to the provider information in the memory;
　sending the link information and the user input information to the portal server via the network;
　receiving the link information and the user input information at the portal server;
　selecting a multimedia information sequence corresponding to the link information and the user input information;
　sending the multimedia information sequence to the receiver via the network;
　receiving and storing the multimedia information sequence at the receiver; and
　playing the multimedia information sequence via the receiver.

103. A method of claim 102 wherein the step e) is performed upon a user request via a user interface.

104. A system for communicating multimedia information via a network, wherein the communication is activated via a printed medium, the system comprising:
　a scanner for machine-readable code containing a link information corresponding to a provider information depicted on the printed medium, the scanner being connected to the network, the scanner containing
　a memory;
　a user interface for obtaining user input information capable of being stored in the memory, the user input information corresponding to the provider information;

a communications bridge for sending the link information and the user input information via the network;

a portal server in communication with the scanner via the network, the portal server capable of receiving the link information and the user input information; selecting a multimedia information sequence corresponding to the link information and the user input information; and sending the multimedia information sequence via the network; and a customer premises equipment in communication with the portal server, the customer premises equipment capable of receiving the multimedia information sequence and playing the multimedia information sequence.

105. A system for communicating multimedia information via a network, wherein the communication is activated via a printed medium, the system comprising:

a user device capable of connecting to the network, the user device containing a scanner and a storage device for machine-readable code containing a link information corresponding to a provider information depicted on the printed medium;

a user interface for obtaining user input information capable of being stored in the storage device, the user input information corresponding to the provider information;

a communications bridge for sending the link information and the user input information via the network;

a display device for receiving multimedia information sequence and playing the multimedia information sequence; and a portal server in communication with the user device via the network, the portal server capable of receiving the link information and the user input information, selecting a multimedia information sequence corresponding to the link information and the user input information, and sending the multimedia information sequence via the network.

106. A system for communicating multimedia information via a network, wherein the communication is activated via a tangible medium, the system comprising:

a user device capable of connecting to the network, the user device containing a transducer and a storage device for machine-readable code containing a link information corresponding to a provider information depicted on the printed medium;

a user interface for obtaining user input information capable of being stored in the storage device, the user input information corresponding to the provider information;

a communications bridge for sending the link information and the user input information via the network;

a display device for receiving multimedia information sequence and playing the multimedia information sequence; and a portal server in communication with the user device via the network, the portal server capable of receiving the link information and the user input information, selecting a multimedia information sequence corresponding to the link information and the user input information, and sending the multimedia information sequence via the network.

* * * * *